April 5, 1949.　　　　C. W. ESCH　　　　2,466,089
BEAN PICKER

Filed April 5, 1948　　　　　　　　　　　　　4 Sheets-Sheet 1

Clarence W. Esch
INVENTOR.

April 5, 1949.   C. W. ESCH   2,466,089
BEAN PICKER

Filed April 5, 1948   4 Sheets-Sheet 2

Clarence W. Esch
INVENTOR.

BY Clarence A. O'Brien
and Harvey B. Jacobson
Attorneys

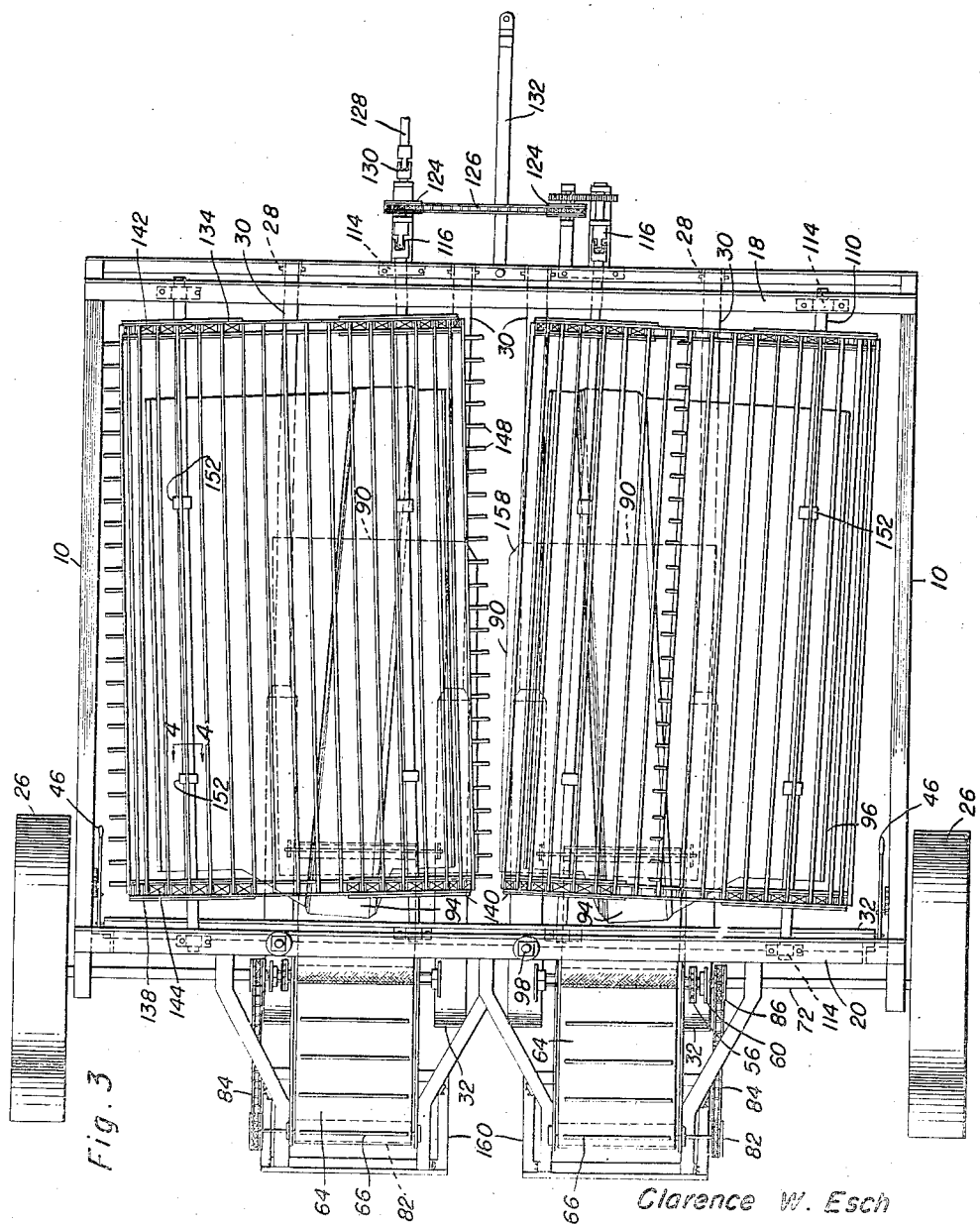

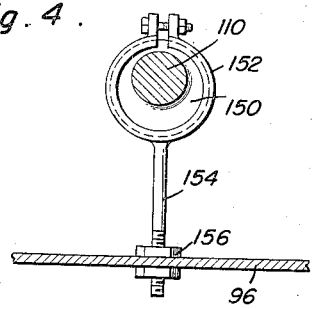
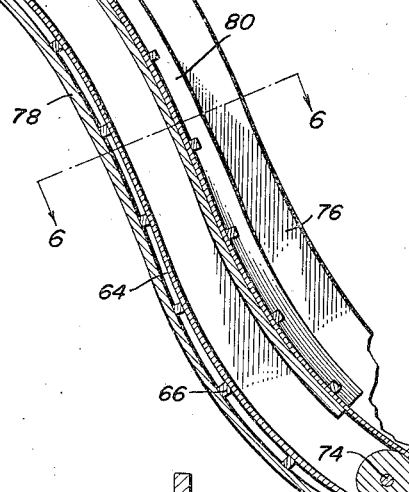
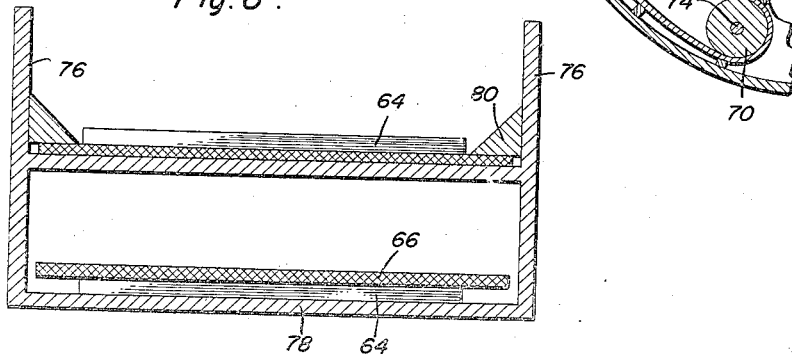

Patented Apr. 5, 1949

2,466,089

UNITED STATES PATENT OFFICE 2,466,089

BEAN PICKER

Clarence W. Esch, Utica, N. Y.

Application April 5, 1948, Serial No. 18,999

7 Claims. (Cl. 56—126)

This invention relates generally to agricultural implements, and more particularly to a bean picker adapted to be powered and drawn by a tractor and having ground-contacting wheels at the rear end thereof.

In brief, this machine includes a frame having a tongue at the front end, ground-contacting wheels at the rear end, a pair of endless revolving screening racks mounted on the frame so that the front ends of the racks diverge and are inclined upwardly, and each rack is also inclined upwardly laterally of the machine, while a sub-frame is pivoted at the front end of the frame and carries bean-gathering trays, conveyors to carry beans rearwardly to an elevator associated with each conveyor, and a ground-contacting shoe which controls the vertical positioning of the rear end of the sub-frame and the parts carried thereby. Each endless screening rack has associated therewith an inner tray which is mounted for vibratory motion during operation of the machine, and an outer tray carried by said sub-frame serves as a guide for the bean vines as well as serving as a chute to guide the picked beans onto the conveyors. The rear end of the sub-frame is resiliently mounted on the frame and means is provided for raising the rear end of the sub-frame when it is desired to transport the picker, as from field to field.

The primary object of this invention is, therefore, to provide a bean picker which will pick the beans gradually from the top of each plant to the lower portions of the plant as the inclined screening racks are drawn along the rows of plants, without pulling the plants loose from the soil, and without loss of any material proportion of the beans.

Another object of this invention is to provide a bean picker which is automatically adjusting, as regards to the clamped guiding means, since the ground-contacting shoes rise and fall according to the height of the row being picked, while the heavier portions of the machine are allowed to move along the row without undue vertical movement.

Still another object of this invention is to provide a bean picker which is easily adjusted for being transported along a road or from field to field.

Still another object of this invention, of a specific nature, is to provide an improved form of endless revolving screen racks to carry out the actual severance of the beans from the vines.

And a last object to be mentioned specifically is to provide a bean picker which is relatively inexpensive and practicable to manufacture, which is simple, safe and extremely convenient to use, and which will give generally efficient and durable service.

With these objects definitely in view, this invention resides in certain novel features of construction, combination and arrangement of elements and portions as will be hereinafter described in the specification, particularly pointed out in the appended claims, and illustrated in the accompanying drawings which form a material part of the application, and in which:

Figure 1 is a side elevational view of the assembled bean picker, the view being taken as from the right-hand side of the machine, and a small portion of the main frame being broken away to disclose a simple chain tightener for the chain connecting one of the driving wheels to the drive shaft of the elevator, the ground-contacting wheel in the foreground being broken away, in part, to disclose underlying structure and in order to amplify the disclosure of this invention;

Figure 3 is a top plan view of the assembled machine;

Figure 4 is an enlarged detail view of the eccentric means used to vibrate the inner tray associated with each of the endless revolving screening racks;

Figure 5 is a longitudinal vertical sectional view of a portion of the elevator; and Figure 6 is a transverse sectional view of the elevator, taken on the line 6—6 in Figure 5.

Similar characters of reference designate similar or identical elements and portions throughout the specification and throughout the several views of the drawings.

Figure 1:
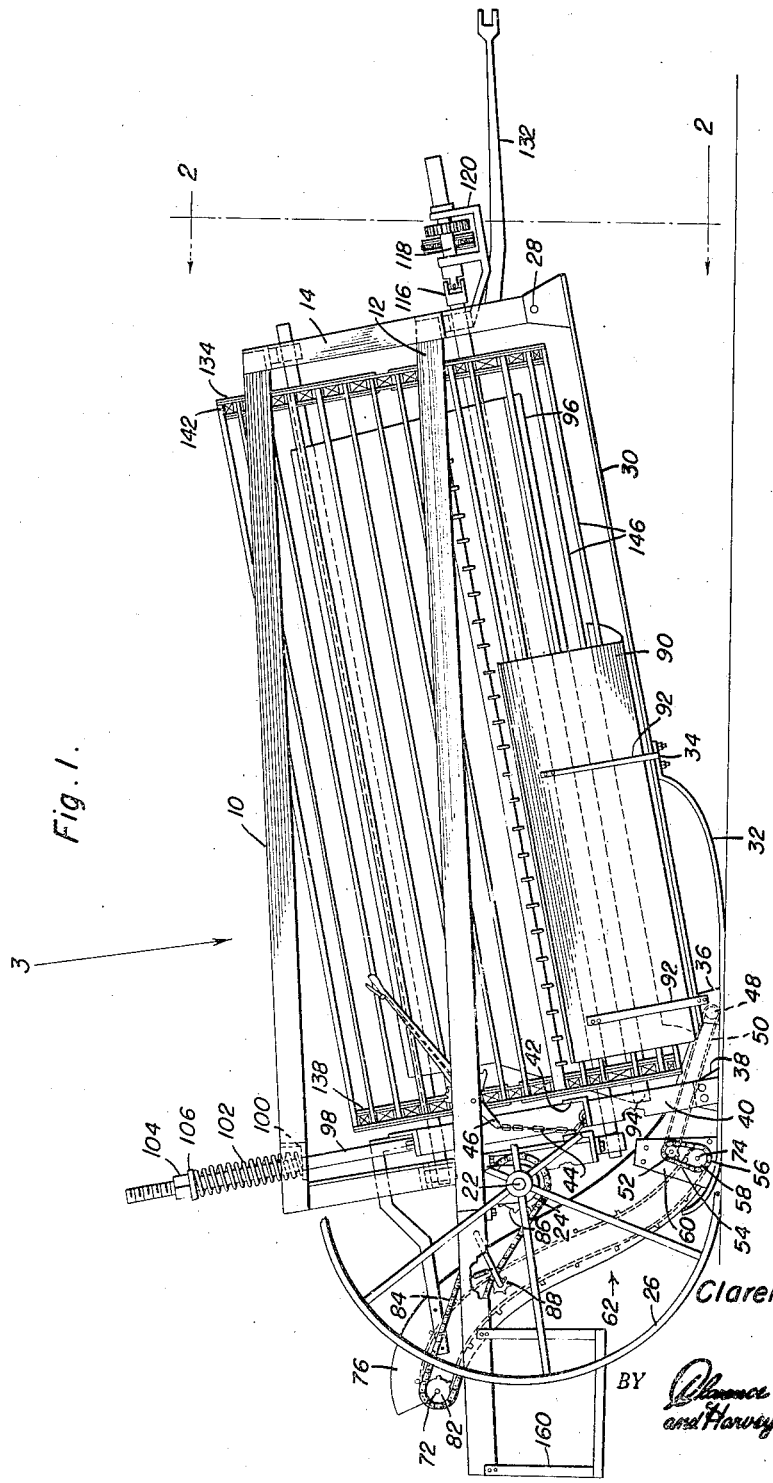
Figure 2:
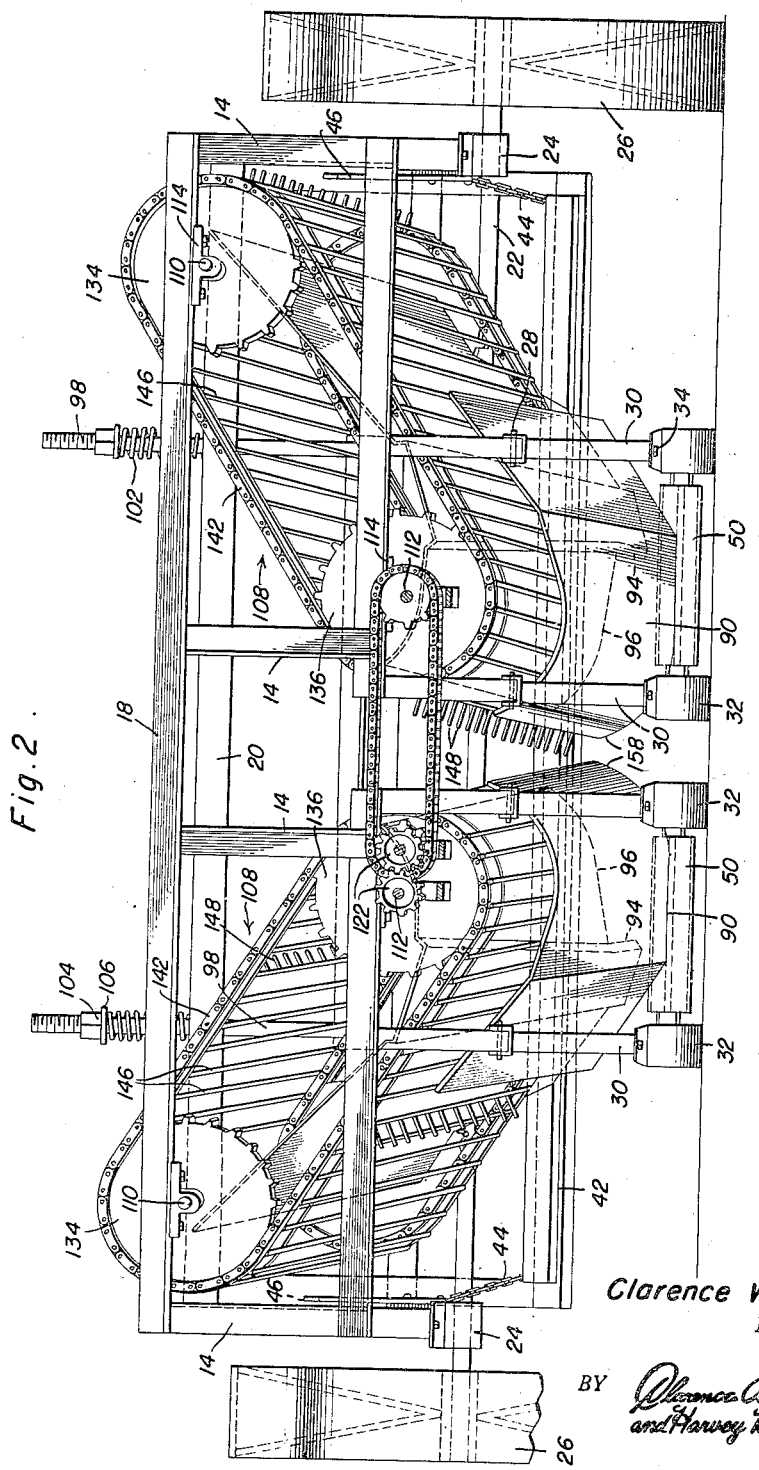
Figure 2 is a front end view of the bean picker, the figure being technically a sectional view taken on the line 2—2 in Figure 1.

Referring now to the drawings in detail, the environment wherewith this invention is adapted to be used includes ordinarily a tractor, not shown, which will be used to propel the machine as well as to provide power to actuate the endless revolving screening racks.

The invention includes a frame comprising upper and lower lateral members 10 and 12, front and rear members 14 and 16 which will ordinarily be of angle iron, and front and rear transverse members 18 and 20, together with a rear axle 22 supported in bearings 24 on the frame and supported by ground-contacting wheels 26 on the ends of the axle, one or both of these wheels being rigidly secured to the axle which serves as a drive shaft.

A sub-frame is pivoted as at 28 to the forward end of the main frame described above, and this sub-frame includes two pairs of downwardly and rearwardly sloping members 30 connected in pairs near the rear of the machine to the ground-contacting shoes 32 which extend from points substantially beneath the axle 22 forwardly to intermediate portions of the members 30 where they are bolted thereto as at 34. These shoes have curved front and rear ends and are provided with upstanding flanges 36 and 38, the latter being bolted or otherwise secured to upright members 40, and these upright members are rigidly connected to a single cross beam of angle iron construction indicated at 42. The cross beam 42 may be extended toward both sides of the machine and chains 44 are used to connect this beam 42 with one end of a lever 46 provided in duplicate one on each side of the machine and pivoted to the lateral frame members 10. It will be understood how this lever may be actuated to raise the shoes 32 and tilt the assembly including the shoes and the members 30 about the pivot point 28 on each front end of the members 30.

The forward pairs of upstanding members 36 on the shoes provide terminal support for a cross shaft 48 and a roller mounted thereon constituting the guide means for the forward end of the conveyor belt 50. The rear roller 52 of this conveyor comprises a drive means for the conveyor and is provided with a sprocket wheel 54 driven by a sprocket chain 56 and another sprocket wheel 58, the support for these last-mentioned members being upright brackets 60 mounted upon the rear end portions of the shoes 32. It should be noted that the conveyor described above is designed for cooperation with an elevator, generally indicated by the numeral 62, and including a conveyor belt 64 with cross pieces 66 comprising simple scoop means carried thereon and this elevator includes upper and lower rollers 68 and 70 driven by the shaft 72 and by the conveyor belt 64, respectively, the roller 70 being mounted upon the shaft 74 which is connected to the sprocket wheel 58 already mentioned. The elevator 62 is preferably S-shaped and will include side members 76 which may be continued to comprise side members for the conveyor, that is, side guide plates on each side of the conveyor belt 50 and the elevator belt 64. The floor member 78 and lateral guide members of angle iron construction 80 will be incorporated with the elevator 62, the structure of which is clearly illustrated in Figure 5. Drive means for the elevator shaft 72 includes a sprocket wheel 82 and a coacting sprocket chain 84 which is entrained around a sprocket wheel 86 on the axle 22. A chain tightener 88 is pivotally mounted on adjacent fixed structure to tauten the sprocket chain 84, this chain tightener being shown to advantage in Figure 1, and the necessity of this chain tightener will be realized when it is considered that the assembly including the members 30, shoes 32 and the conveyor and elevator must all pivot about the pivotal connections 28 when the levers 46 are operated. This assembly also includes what will be referred to hereinafter as outer trays 90 which are arcuate in a transverse direction and extend parallel to the members 30 to which they are secured by means of strap braces 92, the rear brace 92 being preferably also rigidly secured to the upstanding member 36 on each shoe. These outer trays 90 are formed with a trough portion leading directly onto the conveyor, and in this connection it should be noted that a more definite trough 94 is formed in the inner trays 96 which will be subsequently mentioned in greater detail, the trough 94 leading also directly onto the conveyor belt 90. The pivoted assembly mentioned above includes a frame constructed preferably of angle iron, carrying the elongated cross member 42 and depending members 40, and carried by a pair of hanger bars 98 resiliently mounted upon the top lateral frame members 10, as illustrated to advantage in Figure 1, by means of an angle iron structure 100 and a coiled spring 102, the upper ends of the members 98 being threaded and having nuts 104 with washers 106 to bear against the upper end of the spring 102 while the lower end of the same spring is in abutment with the angle iron member 100, thus allowing for adjustment of the compression of the springs 102. Since these springs 102 tend to raise the shoes 32, relative to the main frame of the machine, it will be understood how adjustment of these springs will vary the pressure of the shoes on the ground during the operation of the machine. The chains 44 are ordinarily sufficiently slack to allow limited movement of the above referred to pivoted assembly, while allowing the assembly to be raised by the levers 46, as when the machine is to be moved from field to field or along a highway.

The actual bean engaging members comprise a pair of endless revolving screening racks, generally indicated by the numeral 108, which are mounted on the main or rigid frame portion of the machine in upwardly and forwardly inclined position and with the rear portions thereof converging slightly. The shafts 110 and 112 upon which these endless racks are mounted are terminally mounted in bearings 114 on the front and rear portions of the main frame, and since these shafts are inclined, universal joints 116 are incorporated therewith and stub shafts 118 carried on stub shaft support members 120 rigidly secured on the front end of the main frame are provided as well indicated in the drawings. A pair of gears 122, sprocket wheels 124 and a sprocket chain 126 are operatively connected with the stub shafts 118 so that the power take-off indicated at 128 may be secured to one of these stub shafts through a universal joint 130, it being understood that this machine is to be drawn by a tractor and supported at its front end thereon by a tongue 132. Large sprocket wheels 134 and 136 are secured to the shafts 110 and 112, respectively, adjacent the front ends thereof, while similar large sprocket wheels are similarly mounted near the rear ends of these same shafts, as indicated at 138 and 140. Chains 142 and 144 of endless sprocket character are entrained around the respective pairs of large sprocket wheels and a relatively large plurality of cross members 146 are terminally secured to the said endless sprocket chains, and certain of these members 146 are provided with a plurality of regularly spaced teeth 148 to contact the vines and to strip the beans therefrom. It will be noted that due to the inclination of the endless revolving screening racks, the vines will be first contacted near the tops thereof and as the machine is drawn forwardly, contact is made with the lower portions of the vines. It will also be noted that due to the convergence of these revolving racks, as toward the rear of the machine, the gradually increased stripping action will be made possible. The beans removed from the vines will, in the main, be caught or gathered by the inner trays 96. These trays are illustrated in plan in Figure 3 and are disposed within the revolving racks and inclined similarly therewith. As before stated, the troughs 94 of these inner trays lead to the conveyor belt 50, and to accelerate the movement of the beans along these troughs rearwardly, eccentrics 150 are rigidly secured to the shafts 110 and 112, as best illustrated in Figure 4. These eccentric members 150 are operatively mounted within split bearing members 152 which have depending rods 154 bolted, as indicated at 156, to the adjacent portions of the inner tray 96. It will be clear that this construction allows for the vertical reciprocation of the inner tray as the machine is operated. The beans stripped from the vines will ordinarily fall into these inner trays, but inner portions 158 of the lower trays 90 extend inwardly and downwardly toward the rear of the machine to catch any beans which may fall substantially vertically downwardly from the vines. The beans travel from the trays onto the conveyor belt 50, upwardly on the elevator belt 64, and are deposited in bags or other containers which will be supported on suitable bag or container supporting means mounted on the rear of the frame and generally indicated by the numeral 160, the construction of this last assembly being unimportant in this application.

The operation of this machine will be clearly understood from a consideration of the foregoing description of the mechanical details thereof and further description is deemed unnecessary.

Minor variations departing from the preferred embodiment illustrated in this application may be resorted to without departure from the spirit and scope of this invention and this scope should be determined only by a proper interpretation of the subjoined claims.

Having described the invention, what is claimed as new is:

1. A bean picker comprising a frame having ground-contacting wheels at the rear end and adapted at the front end for connection to a tractor, a pair of endless revolving screening racks mounted on said frame and inclined upwardly toward the front of the picker and inclined upwardly toward the sides of the picker, means to drive said racks, and inclined trays to gather beans removed from bean vines by said racks.

2. A bean picker comprising a frame having ground-contacting wheels at the rear end and adapted at the front end for connection to a tractor, a pair of endless revolving screening racks mounted on said frame and inclined upwardly toward the front of the picker and inclined upwardly toward the sides of the picker, means to drive said racks, and inclined trays to gather beans removed from bean vines by said racks, said racks converging toward the rear of the machine.

3. A bean picker comprising a frame having ground-contacting wheels at the rear end and adapted at the front end for connection to a tractor, a pair of endless revolving screening racks mounted on said frame and inclined upwardly toward the front of the picker and inclined upwardly toward the sides of the picker, means to drive said racks, and inclined trays to gather beans removed from bean vines by said racks, said trays being in pairs with an inner tray inside each endless rack, and an outer tray beneath each endless rack.

4. A picker according to claim 3 and including means to vibrate said inner trays.

5. A bean picker comprising a frame having ground-contacting wheels at the rear end and adapted at the front end for connection to a tractor, a pair of endless revolving screening racks mounted on said frame and inclined upwardly toward the front of the picker and inclined upwardly toward the sides of the picker, means to drive said racks, inclined trays to gather beans removed from bean vines by said racks, said trays being in pairs with an inner tray inside each endless rack, an outer tray beneath each endless rack, a sub-frame pivoted on said frame, said outer trays being mounted on said sub-frame, and an elevator operatively mounted on said sub-frame to carry beans upwardly and rearwardly of the picker.

6. A bean picker comprising a frame having ground-contacting wheels at the rear end and adapted at the front end for connection to a tractor, a pair of endless revolving screening racks mounted on said frame and inclined upwardly toward the front of the picker and inclined upwardly toward the sides of the picker, means to drive said racks, inclined trays to gather beans removed from bean vines by said racks, said trays being in pairs with an inner tray inside each endless rack, an outer tray beneath each endless rack, a sub-frame pivoted on said frame, said outer trays being mounted on said sub-frame, an elevator operatively mounted on said sub-frame to carry beans upwardly and rearwardly of the picker, a conveyor to carry beans from said outer tray to said elevator, both the conveyor and the elevator being driven by said ground-contacting wheels.

7. A picker according to claim 6 and wherein said sub-frame is pivoted at the front of said frame and resiliently connected to the rear portion of said frame, and said sub-frame has ground-contacting shoes.

CLARENCE W. ESCH.

No references cited.